(No Model.)
G. E. BURT.
AUTOMATIC LOADING CART.
No. 326,016. Patented Sept. 8, 1885.
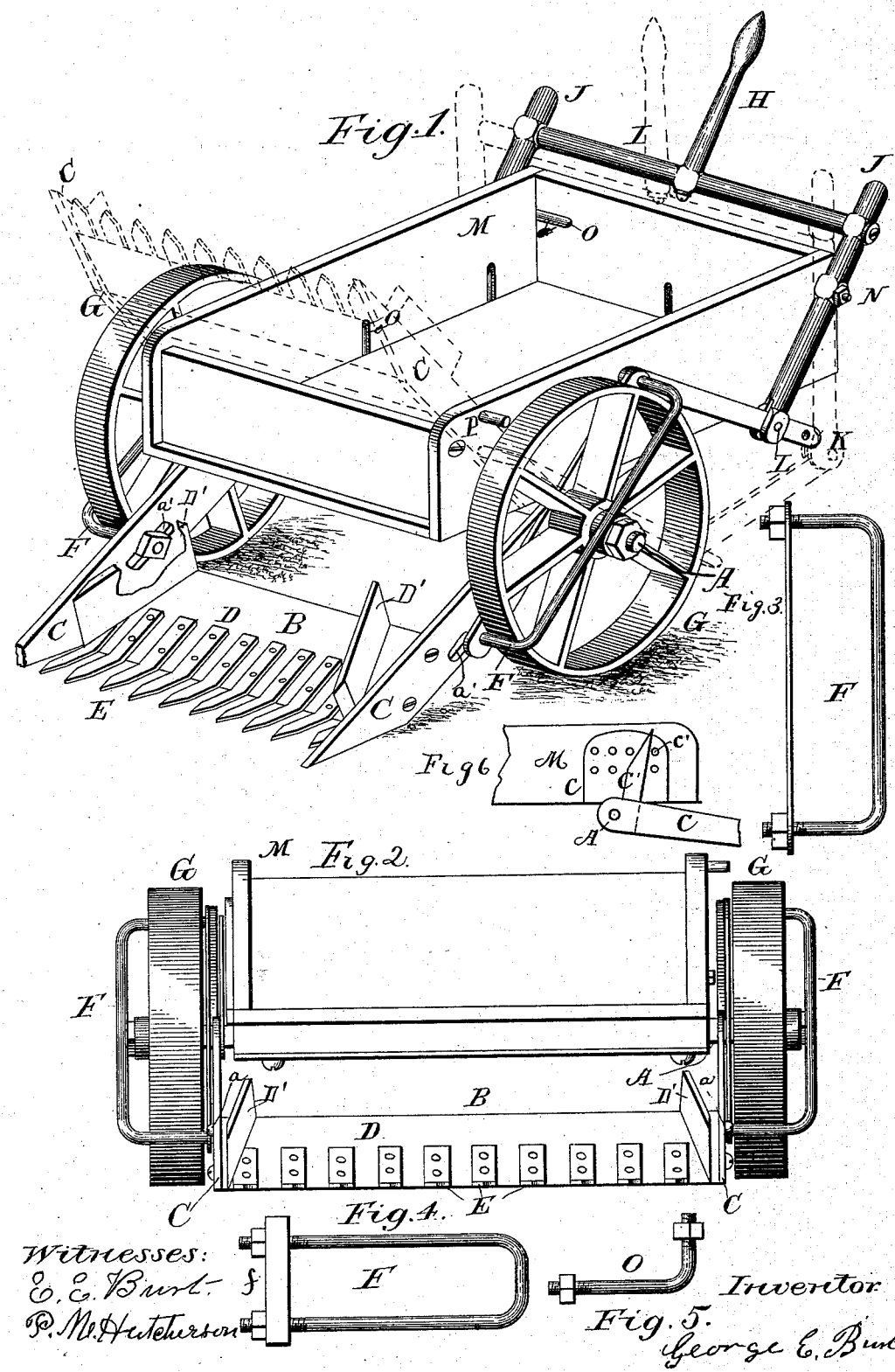

UNITED STATES PATENT OFFICE.

GEORGE E. BURT, OF HARVARD, MASSACHUSETTS.

AUTOMATIC-LOADING CART.

SPECIFICATION forming part of Letters Patent No. 326,016, dated September 8, 1885.

Application filed November 6, 1884. (No model.)

*To all whom it may concern:*

Be it known that I, GEORGE E. BURT, a citizen of the United States, residing in Harvard, in the county of Worcester and State of Massachusetts, have invented a new and useful Improvement in Automatic-Loading Carts, of which the following is a specification.

The object of my invention is to provide novel means for automatically loading carts with manure and other substances, using for this purpose the power of the animal hitched to the cart, as will be fully understood from the following description, when taken in connection with the annexed drawings, in which—

Figure 1 is a perspective of a cart having my improvement applied to it. Fig. 2 is a rear end elevation of the same. Fig. 3 shows one of the clamps detached from the other parts of the loader. Fig. 4 is a view of an adjustable clamp. Fig. 5 shows one of the angle-bolts used for securing the floor of the cart to its sides. Fig. 6 is a view in detail on a small scale, showing the arms C held up by arm C' and pin c'.

M designates the body of a cart, which is mounted on the axle A of two transporting-wheels, G G, and provided with shafts or a draft-tongue. B designates an elevator, which consists of an inclined plane, D, properly shod, and sharpened at its rear edge, and provided with pointed teeth or excavators E, which extend rearward of the said sharp edge and operate, in digging, somewhat like a fork. Near the ends of this digger and elevator D are backwardly-diverging guards or side-boards D' D', which prevent the manure or other material gathered upon the inclined plane D from falling off at the ends thereof. The ends of the digger B are rigidly secured to arms C C, which are pointed at their rear ends, as shown in Fig. 1, and which are pivoted to the axle A, between the sides of the cart-body and the wheels G G.

F F designate what I designate "lifting-clamps," which may be constructed as shown in Figs. 1 and 3, but which I prefer to construct as shown in Fig. 4—that is to say, of a U-shaped portion having a cross-bar, *f*, adjustably secured to its ends for the purpose of regulating its length and grip. These lifting-clamps are slightly less in length than the diameter of the wheels over which they are applied, as shown in Figs. 1 and 2. Their rear inner ends are pivoted at *a* to the side arms, C C, the pivots passing through slots *a' a'*, made longitudinally through the arms. C C. The front inner ends of the lifting-clamps are pivoted to the rear ends of connecting-rods K, the front portions of which latter are pivoted at L to two levers, J J. These levers have their fulcrum at N on the sides of the cart-body, near the front upper corners thereof, and they are rigidly connected together by a horizontal transverse bar, I, to which a hand-lever, H, is secured.

It will be observed by reference to Fig. 1 that I provide the front ends of the connecting-rods K with several holes for the purpose of attaching the lower ends of the levers J to said rod at different points, according to the throw desired.

On one side of the cart-body I provide plate *c*, with numerous holes, and to the arm C, just below said plate, I rigidly secure an arm, C'. Now, when it is desired to dig from a hill or bank, the digger B is raised to the desired height and sustained by a pin, *c'*, as shown in Fig. 6.

P designates a stud or stop fixed to one side of the cart-body at a suitable point, for stopping the forward or dumping movement of the digger at the proper place for discharging its load into the wagon-body.

For the purpose of securing the sides and front end of the wagon-body to the floor thereof, I employ angle-bolts O, screw-threaded on both ends, and form grooves *o* in the sides of the body M. The short arms of the bolts are passed through the said sides and the long arms through the floor. Nuts and washers are then used for rigidly securing the sides to the floor.

The operation of loading is as follows: The hand-lever H is forced forward and the digger allowed to drop to the required position. The cart is then backed and the digger thus caused to enter the material. When a load is gathered on the digger, the lever H is drawn back, thus causing the clamps F to grip the peripheries of the wheels G. The cart is now moved forward and the load discharged into the wagon, at which moment the clamps will be released from the wheels and the digger will fall back in position for gathering another load. This releasing of the clamps is effected by the arms C impinging against the stops P and pressing the hand-lever H forward.

For loading hay, straw, &c., I shall employ a forked elevator adapted for the purpose.

I have above described the clamps F and arms C C as pivoted upon the axle of the transporting-wheels; but I do not confine myself to this location of the pivots.

Having described my invention, I claim—

1. The combination, with the wheels of a cart, of a pivoted elevator, the clamps F, constructed with projecting arms adapted to said wheels, as described, and pivoted to the arms of the elevator, the connecting-rods K, and the levers J, substantially as described.

2. The combination, with the wheels of a vehicle, of the vibrating digger and loader pivoted to the axle thereof, the clamps and their lever-connections, and arm C', perforated plate, and stop-pin, substantially as described.

3. The combination of adjustable clamps composed of the U-shaped part and adjustable cross-bar $f$, with the vehicle-wheels, the digger and loader, and the lever and rod connections, substantially as described.

4. The digger and loader, consisting of an inclined plane terminating in a sharp rear edge, the pointed fingers, the diverging end boards, the arms pivoted to the axle of wheels G, the pivoted clamps, connecting-rods, levers, cross-bar, and hand-lever, substantially as described.

5. The combination of the yoked clamps F, a pivoted elevator connected thereto, as described, and the rods K, connected to the upper ends of said clamps, substantially as specified.

GEORGE E. BURT.

Witnesses:
H. S. HILDRETH,
E. E. BURT.